United States Patent [19]

Chase

[11] 4,104,878
[45] Aug. 8, 1978

[54] PRESSURE RESISTANT MEMBER

[75] Inventor: Michael John Chase, Kidderminster, England

[73] Assignee: Imperial Chemical Industries Limited, London, England

[21] Appl. No.: 750,018

[22] Filed: Dec. 13, 1976

[30] Foreign Application Priority Data

Dec. 23, 1975 [GB] United Kingdom .............. 52618/75

[51] Int. Cl.² ............................................. F02K 9/04
[52] U.S. Cl. ......................................... 60/245; 60/250; 220/207
[58] Field of Search .................. 60/271, 244, 245, 250, 60/254; 220/207, 266, 276; 102/34.5

[56] References Cited

U.S. PATENT DOCUMENTS

| 3,221,495 | 12/1965 | Tweet | 60/254 |
| 3,340,691 | 9/1967 | Mangum | 60/250 |
| 3,445,032 | 5/1969 | Raidl et al. | 137/68 R |
| 3,888,079 | 6/1975 | Diesinger | 60/245 |

FOREIGN PATENT DOCUMENTS 1,012,023 12/1965 United Kingdom.
1,007,506 10/1965 United Kingdom ..................... 137/68

*Primary Examiner*—Robert E. Garrett
*Attorney, Agent, or Firm*—Cushman, Darby & Cushman

[57] ABSTRACT

A plug for closing an opening in a partition between rocket motor chambers is made in segments and will resist a relatively high pressure differential between the chambers in one direction but will unblock the opening in response to a relatively low pressure differential between the chambers in the other direction.

6 Claims, 3 Drawing Figures

PRESSURE RESISTANT MEMBER

BACKGROUND OF THE INVENTION

The present invention relates to members for separating pressure chambers to control flow of pressure fluid between them.

SUMMARY OF THE INVENTION

The invention may provide a member which is arranged to disintegrate when subjected to a predetermined pressure differential between the chambers. For example, the member may be made in a plurality of segments which may be arranged to separate from each other in response to said differential. Preferably the segments are discrete segments.

In its preferred form, the invention provides a member for controlling flow between pressure chambers comprising an assembly of discrete segments the assembly being adapted for location in an opening between the chambers in use such that it will resist flow between the chambers via the opening in one direction but will disintegrate into bodies no larger than said discrete segments to permit flow between the chambers in the opposite direction.

At least one, and preferably each, such segment may be arranged to wedge against its neighbour and/or adjacent support structure when subjected to a pressure differential in the one direction, but not in the opposite direction.

One or more of the segments may be adapted to be removed from the member more easily than the others, to facilitate disintegration. For example, the segments may be bonded together to produce the member, and the bond strengths between the segments, and/or between the segments and adjacent support structure may be adjusted to facilitate removal of one or more of said segments before the others. Alternatively, the bond areas may be adjusted in relation to the area of an associated segment which is subjected to pressure in use. In a further possible arrangement, certain segments are held in place mechanically until the member disintegrates due to removal of the other segments.

The member may comprise an inner segment surrounded by a plurality of other segments. In this case, the inner segment may be removable more easily than the outer segments.

The invention may also provide a member, such as the disintegrating member defined above, which is resistant to a higher pressure differential in one direction between the chambers than in the opposite direction. This may be arranged by suitable shaping of a surface of the member which co-operates with a support structure in use. For example, the surface of the member may be arranged to wedge into the support structure when subjected to a pressure differential in said one direction.

The invention extends to two pressure chambers separated by a member as defined above. The chambers may be chambers of a rocket motor, and may contain, or be adapted to contain, a boost propellant and a sustain propellant respectively. The member may be arranged to resist a higher pressure differential from the boost chamber to the sustain chamber other than in the opposite direction.

The chambers of a rocket motor may be separated by a partition which comprises an expansion nozzle, and said member may provide a plug for the nozzle. There may be a further nozzle, or a group of nozzles, through which all exhaust from the rocket motor must pass, and the member may be adapted to disintegrate into pieces of a size which will pass through said further nozzle, or nozzles of said group.

BRIEF DESCRIPTION OF THE DRAWINGS

By way of example, one embodiment of the invention will now be described with reference to the accompanying drawings in which.

DESCRIPTION OF THE PREFERRED EMBODIMENT

Figure 3:
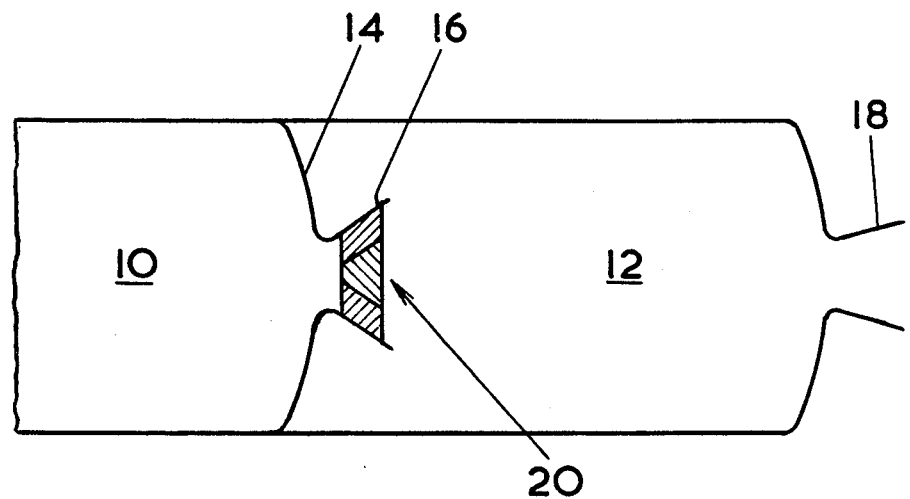
FIG. 3 is a diagrammatic section of a rocket motor incorporating a plug as shown in FIGS. 1 and 2.

Consider first the rocket motor diagrammatically shown in FIG. 3. This comprises two chambers indicated at 10 and 12 respectively. Chamber 12 contains a boost propellant in use, and chamber 10 contains a sustain propellant. Chamber 10 is separated from chamber 12 by a partition 14 which incorporates an expansion nozzle 16. Chamber 12 has a conventional expansion nozzle 18 at its rear end. All exhaust from the rocket motor must pass through the latter expansion nozzle.

The boost propellant in chamber 12 will be arranged to burn for a relatively short time, and will create a relatively high pressure differential between the chambers 10 and 12. It is necessary to isolate the chamber 10 from this pressure during the boost portion of the rocket flight, and this is done by means of the plug 20 which is shown in position in the expansion nozzle 16. At the termination of the boost period, the sustain propellant will be ignited, and it will be necessary to remove the plug 20 from the nozzle 16, and to ensure that it will pass through the nozzle 18 without blocking it.

Figure 1:
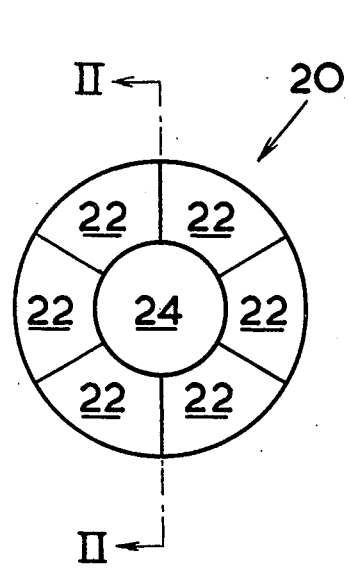
FIG. 1 is an end elevation of a plug in accordance with the invention.
Figure 2:
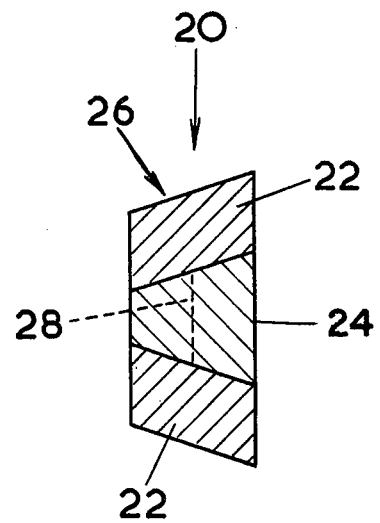
FIG. 2 is a section on the line II in FIG. 1.

A suitable plug for the above purpose is shown in FIGS. 1 and 2, and comprises seven segments six of which segments 22 form an annulus surrounding a central segment 24. The outer surface 26 of the plug lies on a frusto-cone, and the central segment 24 is also a frusto-cone. The apex angles of these cones are the same as shown in the drawing, but this is not necessary. The surface 26 is arranged to co-operate with a portion of the expansion nozzle 16 so that the plug wedges into that expansion nozzle in response to a pressure differential urging it inwardly of the chamber 10. However, the plug will disintegrate into its segments in response to a pressure differential urging it into the chamber 12. The pressure differential required to produce this disintegration is substantially lower than the pressure differential which the plug can resist in the opposite direction, that is from the chamber 12 towards the chamber 10.

The segments 22, 24 may be bonded together by a weak adhesive, which may, for convenience, cure at room temperature. Suitable adhesives are Dow Corning 3144 RTV and ICI Silcoset 105. To ensure the required disintegration, segment 24 is adapted to be removed more easily from the plug in response to pressure than the other segments. To this end, the ratio "bond area: area subjected to pressure" is made lower for segment 24 than for the other segments. If necessary, this can be done by making segment 24 axially shorter than the other segments, for example by cutting it off at the dotted line 28 shown in FIG. 2.

In alternative methods of ensuring disintegration of the plug the strength of the bond between segment 24 and those surrounding it is made weaker than the strength of bond between the outer segments and the nozzle 16. For example, different adhesives could be used, and/or bonding conditions at the two locations could be different. A further possibility is mechanical interference with removal of at least some of the outer segments 22, for example by projection of mechanical abutments over outer portions thereof.

The illustrated plug may be assembled in situ in the nozzle 16. Alternatively, it may be pre-assembled, and bonded into the nozzle as an assembly. The axial thickness of the plug is made such as to resist the high pressure differential during the boost phase of the rocket flight. The apex angle of the outer frusto-cone is made such as to co-operate with the desired portion of the nozzle. A suitable angle is in the range 5°–30° for example 15°. The plug should be made of a material which is resistant to the high temperature and high erosive conditions which it will experience during the boost flights. A suitable material is that sold under the name "Durestos" (Registered Trade Mark).

The invention is not limited to details of the embodiment illustrated in the drawings. The plug may have any desired number of segments, arranged in any convenient fashion. The invention is not limited to use in rocket motors, although it is particularly useful in rocket motors using solid fuel propellants. The segments do not necessarily pass through the nozzle 18 as unitary bodies; they may break down into still smaller bodies. There may be a group of nozzles at the exit end of the motor instead of the single nozzle 18 shown in the drawing. Similarly, there may be a group of nozzles between chambers of the motor, and any one or more may have a plug according to the invention. Alternatively, an opening between the chambers may not be of nozzle form but merely a communication part arranged to receive the plug. It is not essential that the plug be made to resist a substantially higher pressure differential in the one direction than in the other, but this may be desirable in order to ensure avoidance of undesirable pressure build up in the second chamber.

I claim:

1. A member for controlling flow between pressure zones comprising an assembly of discrete segments adhesively bonded together in side-by-side relationship to form a disc-like member, the assembly being adapted for location in an opening between the zones in use such that it will resist flow between the zones via the opening in one direction, but will disintegrate into bodies no larger than said discrete segments to permit flow between the zones in the opposite direction.

2. A member as claimed in claim 1 wherein the assembly of segments is such that the member will disintegrate at a pressure differential in said opposite direction which is low relative to the pressure differential which the member can resist in the one direction.

3. A member as claimed in claim 1 wherein at least one of said segments is adapted to wedge against its neighbour in the assembly and/or an adjacent support structure when subjected to a pressure differential in said one direction.

4. A member as in claim 1 wherein the adhesive bonding is such that at least one of the segments can be removed from the assembly more easily than the others.

5. A member as in claim 1 located between pressure zones in a rocket motor.

6. A member as claimed in claim 5 wherein the motor comprises a nozzle, or group of nozzles through which the bodies must pass.

* * * * *

UNITED STATES PATENT OFFICE
CERTIFICATE OF CORRECTION

Patent No. 4,104,878        Dated August 8, 1978

Inventor(s) Michael John Chase

It is certified that error appears in the above-identified patent and that said Letters Patent are hereby corrected as shown below:

At paragraph [73] on the front page format, correct the assignee to --Imperial Metal Industries (Kynoch) Limited, Birmingham, England--

*Signed and Sealed this*

*Twenty-fourth* Day of *April 1979*

[SEAL]

Attest:

RUTH C. MASON
*Attesting Officer*

DONALD W. BANNER
*Commissioner of Patents and Trademarks*